US009164986B2

(12) United States Patent
Knipfer et al.

(10) Patent No.: US 9,164,986 B2
(45) Date of Patent: Oct. 20, 2015

(54) REAL-TIME MULTI-LINGUAL ADAPTATION OF MANUFACTURING INSTRUCTIONS IN A MANUFACTURING MANAGEMENT SYSTEM

(75) Inventors: Ivory W. Knipfer, Rochester, MN (US); John W. Marreel, Rochester, MN (US); Kay M. Momsen, Rochester, MN (US); Ryan T. Paske, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1549 days.

(21) Appl. No.: 11/782,762

(22) Filed: Jul. 25, 2007

(65) Prior Publication Data

US 2009/0030670 A1  Jan. 29, 2009

(51) Int. Cl.
*G06F 17/28* (2006.01)

(52) U.S. Cl.
CPC ..................... *G06F 17/289* (2013.01)

(58) Field of Classification Search
CPC ..... G06F 17/289; G06F 9/4448; G06F 17/28; G06F 17/2827; G06F 17/27; G06F 17/275; G06F 17/30669; G06F 17/2881; G06F 17/30401; G06F 17/3066; G06F 17/248; G06F 17/30557; G06F 17/30699; G06F 17/30867
USPC ............... 704/277, 1–10, 251, 255, 257, 270; 379/88.06
See application file for complete search history.

(56) References Cited

U.S. PATENT DOCUMENTS

| 6,681,380 B1 | 1/2004 | Britton et al. |
| 7,657,006 B2 * | 2/2010 | Woodring ................. 379/88.06 |
| 2003/0125927 A1 | 7/2003 | Seme |
| 2005/0246639 A1 | 11/2005 | Zellner et al. |
| 2006/0023869 A1 | 2/2006 | Reynolds et al. |
| 2006/0222154 A1 | 10/2006 | Naick et al. |
| 2006/0242621 A1 | 10/2006 | Ye et al. |

FOREIGN PATENT DOCUMENTS

WO  0131902 A2  5/2001

OTHER PUBLICATIONS

Nestor Rychtyckyj "Machine Translation for Manufacturing: A Case Study at Ford Motor Company", American Association for Artifical Intellegence, 2006.*

* cited by examiner

*Primary Examiner* — Huyen Vo

(74) *Attorney, Agent, or Firm* — Steven M. Greenberg, Esq.; CRGO Law

(57) ABSTRACT

Embodiments of the present invention provide a method, system and computer program product for real-time multi-lingual adaptation of manufacturing instructions in a manufacturing management system. In one embodiment of the invention, a manufacturing language adaptation method can be provided. The method can include identifying an operator receiving manufacturing instruction, determining a primary language preference for the operator and determining whether or not the manufacturing instructions have been translated into the primary language preference. If it is determined that the manufacturing instructions have been translated into the primary language preference, the manufacturing instructions can be presented to the operator in the primary language preference. Otherwise the manufacturing instructions can be submitted to a translation engine for translation into the primary language preference.

9 Claims, 2 Drawing Sheets

REAL-TIME MULTI-LINGUAL ADAPTATION OF MANUFACTURING INSTRUCTIONS IN A MANUFACTURING MANAGEMENT SYSTEM

BACKGROUND OF THE INVENTION

1. Field of the Invention

The present invention relates to the field of manufacturing activity management and more particularly to multi-lingual translation of manufacturing instructions for manufacturing activities in a manufacturing management system.

2. Description of the Related Art

As the global economy provides a proliferation of options for businesses to expand into emerging markets, manufacturing success increasingly can be defined by how fast one acts and how well one reacts to supply chain volatility. Modern production facilities increasingly are becoming more complex as customers expect manufacturers to maintain low prices while readily accommodating last-minute changes in quantity, product configuration or delivery date. Thus, effectively managing the timing, order policy, and supply and inventory considerations involved in new product introductions or upgrades, greatly impact cycle times, potential business opportunities, and most importantly sales and profits.

With the location of global manufacturing plants around the globe, native language support for manufacturing operations has become an ever increasing management challenge. In particular, in a global manufacturing operation, different personnel can speak different languages irrespective of jurisdictional location, and manufacturing floor location, and further irrespective of assigned order and utilized computer workstation. Especially in view of modern free trade agreements, manufacturing even within a single location in the United States of America, mixed nationalities and languages has become prevalent amongst employees sharing the same job.

Current manufacturing floor control systems have been enabled in a single base language. Technologies for language globalization of computing systems intend upon addressing multi-lingual support for software applications. National Language Support (NLS) is one such technology; however, to install NLS on an expansive deployment of a legacy manufacturing control system would be cost prohibitive. Further, where NLS support has been implemented in floor control system, the NLS support tends to be global in nature and does not provide a granular level of language support on an order by order, activity by activity basis. As such, in an NLS supported system, each shared work station must change language setup for a particular employee for a particular native language so that the entire workstation operates in the preferred language. Of course, to activate NLS support for an entire workstation can introduce incompatibilities with ancillary applications, documentation, and tools that have not been NLS enabled.

Importantly, NLS support does not compute multiple languages for the same operator based upon different locations, different orders, or different order characteristics. For example, some manufacturing instructions are adequately processed in Mandarin Chinese, for an operator in a mainland China location, yet if a manufacturing operation performed in the mainland China location relates to the visual matching of an English language label for a manufactured product to a known bill of materials (BOM) structure, then the manufacturing operation ought to be presented in the English language even though the operator speaks Mandarin Chinese and the manufacturing operation is performed in mainland China. Yet, conventional NLS methods require an all or nothing approach to provide all manufacturing operation instructions in Mandarin Chinese or English irrespective of the manufacturing operation performed.

BRIEF SUMMARY OF THE INVENTION

Embodiments of the present invention address deficiencies of the art in respect to the globalization of manufacturing systems and provide a novel and non-obvious method, system and computer program product for real-time multi-lingual adaptation of manufacturing instructions in a manufacturing management system. In one embodiment of the invention, a manufacturing language adaptation method can be provided. The method can include identifying an operator receiving manufacturing instruction, determining a primary language preference for the operator and determining whether or not the manufacturing instructions have been translated into the primary language preference. If it is determined that the manufacturing instructions have been translated into the primary language preference, the manufacturing instructions can be presented to the operator in the primary language preference. Otherwise the manufacturing instructions can be submitted to a translation engine for translation into the primary language preference.

In one aspect of the embodiment, an operation for the manufacturing instructions can be identified, and the primary language preference can be determined additionally based upon the operation for the manufacturing instructions. In another aspect of the embodiment, a product for the manufacturing instructions can be identified and the primary language preference can be determined additionally based upon the product for the manufacturing instructions. In yet another aspect of the embodiment, a location of the operator can be determined and the primary language preference can be determined additionally based upon the location of the operator. Finally, in even yet another aspect of the embodiment, each of a location of the operator and an operation and product for the manufacturing instructions can be identified and the primary language preference can be determined additionally based upon the location of the operator and the operation and product for the manufacturing instructions.

In another embodiment of the invention, a manufacturing management data processing system can be provided. The system can include a supply chain management system coupled to a repository of multi-lingual manufacturing instructions for different manufacturing operations for different products and a self-adjusting translation processor coupled to a translation engine. The system also can include real-time multi-lingual adaptation logic. The logic can include program code enabled to identify an operator receiving manufacturing instructions, to determine a primary language preference for the operator, to determine whether or not the manufacturing instructions have been translated into the primary language preference, and to present the manufacturing instructions to the operator in the primary language preference if it is determined that the manufacturing instructions have been translated into the primary language preference, and to otherwise submit the manufacturing instructions to the translation engine for translation into the primary language preference.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for the real-time multi-lingual adaptation of manufacturing instructions in a manufacturing management data processing system. In accordance with an embodiment of the present invention, a manufacturing instruction can be received for a manufacturing activity in association with a production order in the manufacturing management data processing system. The operator receiving the instruction can be identified and a corresponding profile for the operator can be retrieved to determine a primary language. If the manufacturing instruction has not been previously translated into the primary language, a black box translator can be invoked to translate the manufacturing instruction into the primary language. Thereafter, the manufacturing instruction can be provided to the operator in the primary language.

Figure 1:
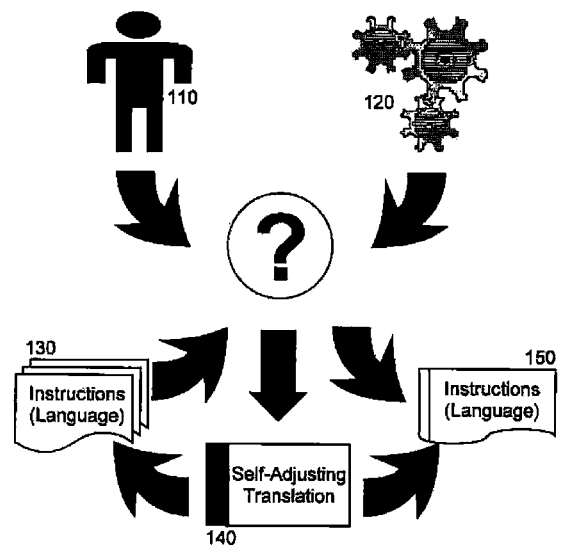
FIG. 1 is a pictorial illustration of a process for the real-time multi-lingual adaptation of manufacturing instructions in a manufacturing management system.

In illustration, FIG. 1 pictorially depicts a process for the real-time multi-lingual adaptation of manufacturing instructions in a manufacturing management system. As shown in FIG. 1, the within a manufacturing process, the identity of an operator 110 and a current manufacturing operation 120 can be determined in order to retrieve language specific manufacturing operation instructions 150 from amongst a repository of instructions 130. The language specific manufacturing operation instructions 150 can be composed in a language specific to the language preferences of the operator 110 and current manufacturing operation 120.

To the extent that language specific manufacturing operation instructions 150 cannot be located in the repository of instructions 130, self-adjusting translation logic 140 can be invoked to generate the language specific manufacturing operation instructions 150 from instructions composed in a base language. In this way, as the language preferences change for different operators and different operations, the language of the instructions presented to the operator when addressing a specific manufacturing operation can change without requiring wholesale modifications to the manufacturing management system. Additionally, the language of the instructions can vary on an operator by operator basis and an operation by operation basis irrespective of the geographic location of the operator addressing the operation.

Figure 2:
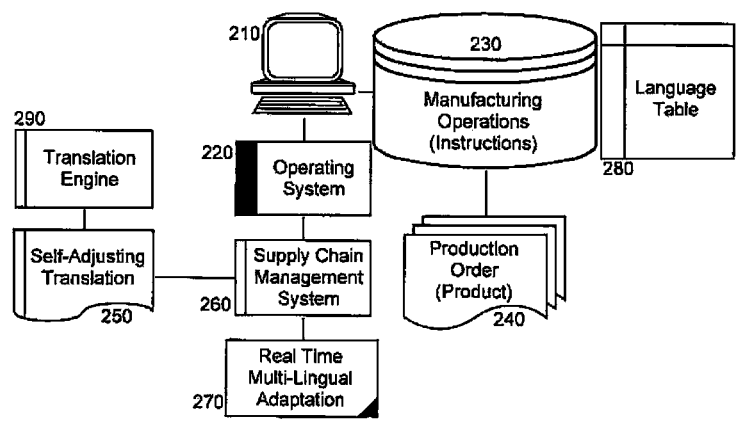
FIG. 2 is a schematic illustration of a manufacturing management data processing system configured for the real-time multi-lingual adaptation of manufacturing instructions; and, FIG. 3 is a flow chart illustrating a process for the real-time multi-lingual adaptation of manufacturing instructions in the management data processing system of FIG. 2; and, FIG. 4 is a flow chart illustrating a process for self-adjusting translation of manufacturing instructions in the management data processing system of FIG. 2.

Notably, the process of real-time multi-lingual adaptation of manufacturing instructions in a manufacturing management system can be performed in a manufacturing management data processing system. In illustration, FIG. 2 schematically depicts a manufacturing management data processing system configured for the real-time multi-lingual adaptation of manufacturing instructions. The system can include a host computing platform 210 including an operating system 220. The operating system 220 can support the operation of a supply chain management system 260 configured to access manufacturing data 230, including manufacturing instructions for different manufacturing operations to process one or more production orders 240 for one or more products.

Real-time multi-lingual instruction adaptation logic 270 can be coupled to the supply chain management system 260. The real-time multi-lingual instruction adaptation logic 270 can include program code enabled to access a language table 280 to determine a preferred language for presenting a manufacturing operation instruction according to any combination of the identity of an operator receiving the instruction, the geographic location of the operator, the operation for the instruction and the product associated with the operation. To the extent that the manufacturing operation instruction cannot be presented in a preferred language, self-adjusting translation processor 250 can call a translation engine 290 to translate a base language form of the manufacturing operation instruction into the preferred language for presentation to the operator.

Figure 3:
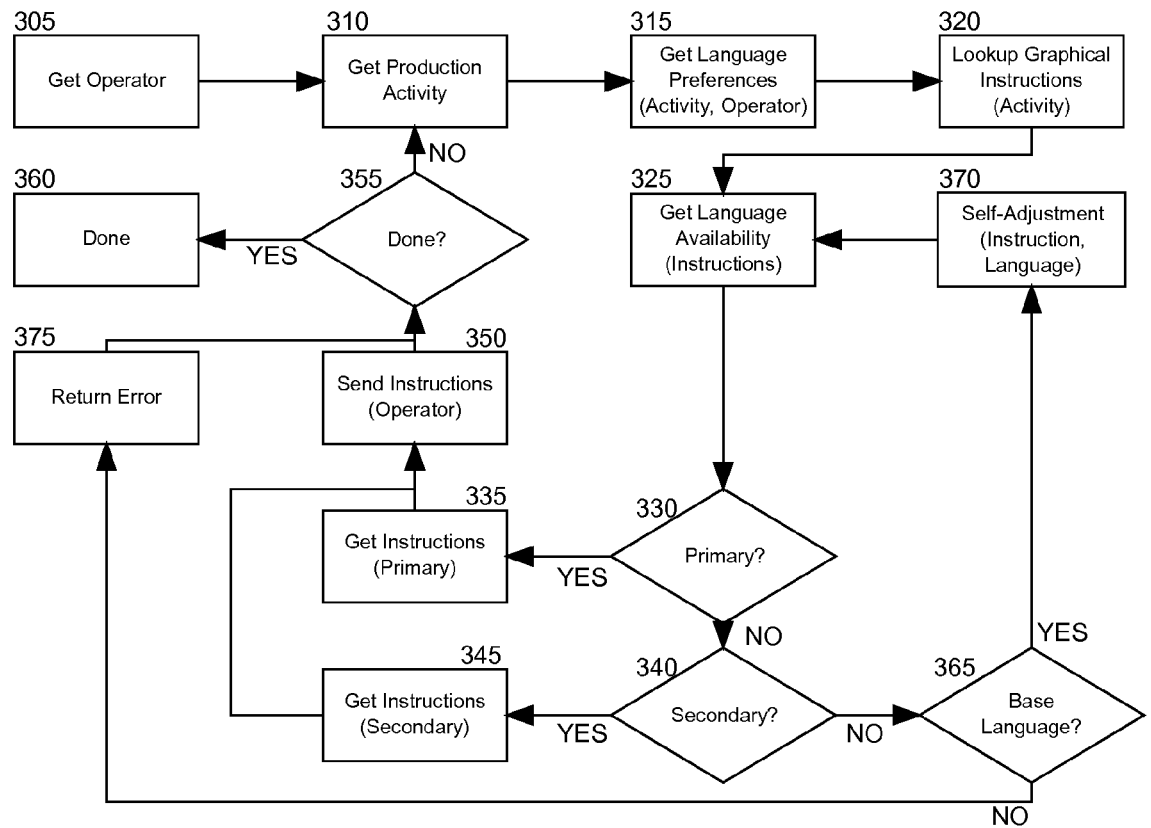

In further illustration, FIG. 3 is a flow chart illustrating a process for the real-time multi-lingual adaptation of manufacturing instructions in the management data processing system of FIG. 2. Beginning in block 305, an operator and the operator's location can be identified and a production activity can be determined for a manufacturing process in block 310. In block 315, a language preference can be retrieved for each of the activity, operator and location. In this regard, both a primary language preference and a secondary language preference can be determined. Thereafter, graphical instructions for the activity can be retrieved in block 320 and a listing of different languages available for the graphical instructions can be retrieved in block 325.

In decision block 330, it can be determined whether the graphical instructions are available for presentation in a primary language preference for the operator, location and the activity. If so, the instructions can be retrieved in the primary language preference in block 335. Otherwise, in decision block 340 it can be determined whether the graphical instructions are available for presentation in a secondary language preference for the operator, location and the activity. If so, the instructions can be retrieved in the secondary language preference in block 345. Thereafter, in block 350 the instructions can be transmitted to the operator in either the primary language or the secondary language as the case may be.

In decision block 340, if the instructions cannot be retrieved in either the primary or secondary language preference due to the unavailability of the instructions in either language preference, in decision block 365, it can be determined whether the instructions exist in a base language suitable for translation. If not, in block 375 an error can be returned for the instructions. However, if a base language form of the instructions exist as determined in decision block 365, in block 370 a self-adjustment process can be called to translate the instructions into either or both of the primary and secondary language preferences before the process can return to block 325. Once the instructions have been forwarded to the operator in block 350, if no additional activities remain to be processed in decision block 355, in block 360 the process can end.

Figure 4:
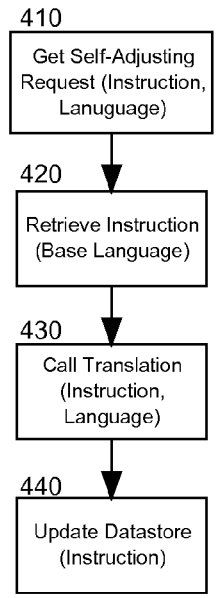

Turning now to FIG. 4, a flow chart is shown illustrating a process for self-adjusting translation of manufacturing instructions in the management data processing system of FIG. 2. Beginning in block 410, a self-adjustment process can be received to translate instructions into either or both of a primary and secondary language preference. In block 420, the instructions can be received in a base language suitable for translation and in block 430, a translation engine can be called to translate the instruction from the base language to one or both of the primary and secondary language preferences. Thereafter, in block 440 the data store of multi-lingual instructions can be updated with the newly translated form of the instructions.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A manufacturing language adaptation method comprising:
   receiving from a database a manufacturing instruction for a manufacturing activity in association with a production order in memory of a manufacturing management data processing system executing in memory of a computer;
   identifying by a processor of the computer an operator receiving the manufacturing instructions;
   determining by the processor a primary language preference for the operator based either upon an operation for the manufacturing instructions, or upon a product for the manufacturing instructions;
   determining by the processor whether or not the manufacturing instructions have been translated into the primary language preference; and,
   presenting by the processor the manufacturing instructions to the operator in the primary language preference if it is determined by the processor that the manufacturing instructions have been translated into the primary language preference, and otherwise submitting the manufacturing instructions to a translation engine for translation into the primary language preference.

2. The method of claim 1, further comprising:
   identifying a location of the operator; and,
   determining the primary language preference additionally based upon the location of the operator.

3. The method of claim 1, further comprising:
   further determining a secondary language preference for the operator;
   determining whether or not the manufacturing instructions have been translated into the secondary language preference; and,
   presenting the manufacturing instructions to the operator in the secondary language preference if it is determined that the manufacturing instructions have not been translated into the primary language preference, but have been translated into the secondary language preference, and otherwise submitting the manufacturing instructions to a translation engine for translation into the primary language preference.

4. The method of claim 1, wherein submitting the manufacturing instructions to a translation engine for translation into the primary language preference, comprises:
   determining whether or not the manufacturing instructions exist in a base language suitable for translation;
   submitting the manufacturing instructions to the translation engine if the instructions exist in the base language; and,
   otherwise returning an error to the operator.

5. A manufacturing management data processing system comprising:
   at least one processor coupled directly or indirectly to memory elements through a system bus;
   a supply chain management system executing in local memory and coupled to a repository of multi-lingual manufacturing instructions for different manufacturing operations for different products;
   a self-adjusting translation processor coupled to a translation engine; and,
   real-time multi-lingual adaptation logic comprising program code enabled upon execution in the local memory to identify an operator receiving manufacturing instructions, to determine a primary language preference for the operator based either upon an operation for the manufacturing instructions, or upon a product for the manufacturing instructions, to determine whether or not the manufacturing instructions have been translated into the primary language preference, and to present the manufacturing instructions to the operator in the primary language preference if it is determined that the manufacturing instructions have been translated into the primary language preference, and to otherwise submit the manufacturing instructions to the translation engine for translation into the primary language preference.

6. A computer program product comprising a computer usable storage memory device storing computer usable program code for manufacturing language adaptation, the computer program product comprising:
- computer usable program code for receiving from a database a manufacturing instruction for a manufacturing activity in association with a production order in memory of a manufacturing management data processing system executing in memory of a computer;
- computer usable program code for identifying by a processor of the computer an operator receiving the manufacturing instructions;
- computer usable program code for determining by the processor a primary language preference for the operator based either upon an operation for the manufacturing instructions, or upon a product for the manufacturing instructions;
- computer usable program code for determining by the processor whether or not the manufacturing instructions have been translated into the primary language preference; and,
- computer usable program code for presenting by the processor the manufacturing instructions to the operator in the primary language preference if it is determined by the processor that the manufacturing instructions have been translated into the primary language preference, and otherwise submitting the manufacturing instructions to a translation engine for translation into the primary language preference.

7. The computer program product of claim 6, further comprising:
- computer usable program code for identifying a location of the operator; and,
- computer usable program code for determining the primary language preference additionally based upon the location of the operator.

8. The computer program product of claim 6, further comprising:
- computer usable program code for further determining a secondary language preference for the operator;
- computer usable program code for determining whether or not the manufacturing instructions have been translated into the secondary language preference; and,
- computer usable program code for presenting the manufacturing instructions to the operator in the secondary language preference if it is determined that the manufacturing instructions have not been translated into the primary language preference, but have been translated into the secondary language preference, and otherwise submitting the manufacturing instructions to a translation engine for translation into the primary language preference.

9. The computer program product of claim 6, wherein the computer usable program code for submitting the manufacturing instructions to a translation engine for translation into the primary language preference, comprises:
- computer usable program code for determining whether or not the manufacturing instructions exist in a base language suitable for translation;
- computer usable program code for submitting the manufacturing instructions to the translation engine if the instructions exist in the base language; and,
- computer usable program code for otherwise returning an error to the operator.

* * * * *